Aug. 1, 1944.   W. S. TANDLER ET AL   2,354,843
CONTROL MECHANISM
Filed Sept. 12, 1941   5 Sheets-Sheet 3
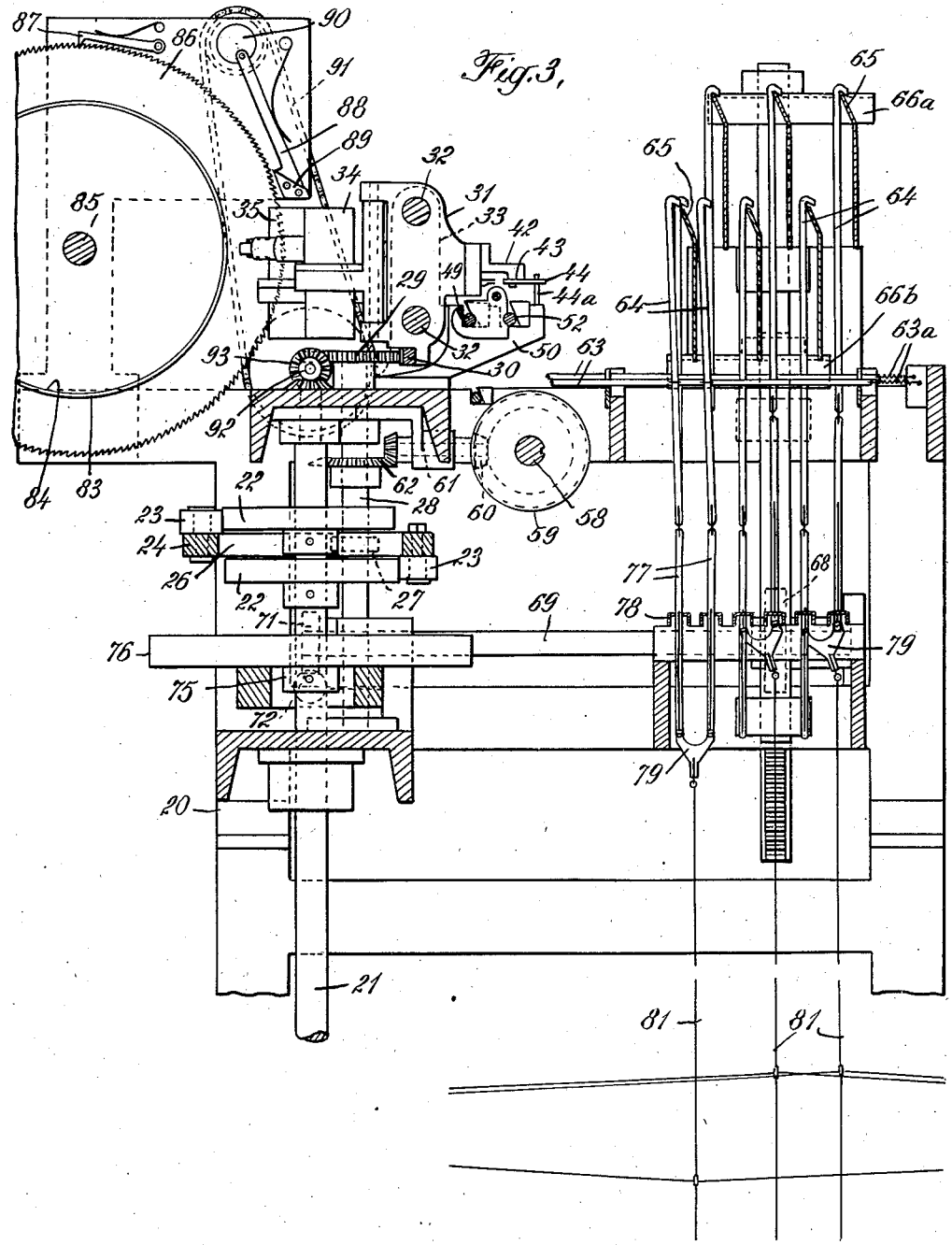

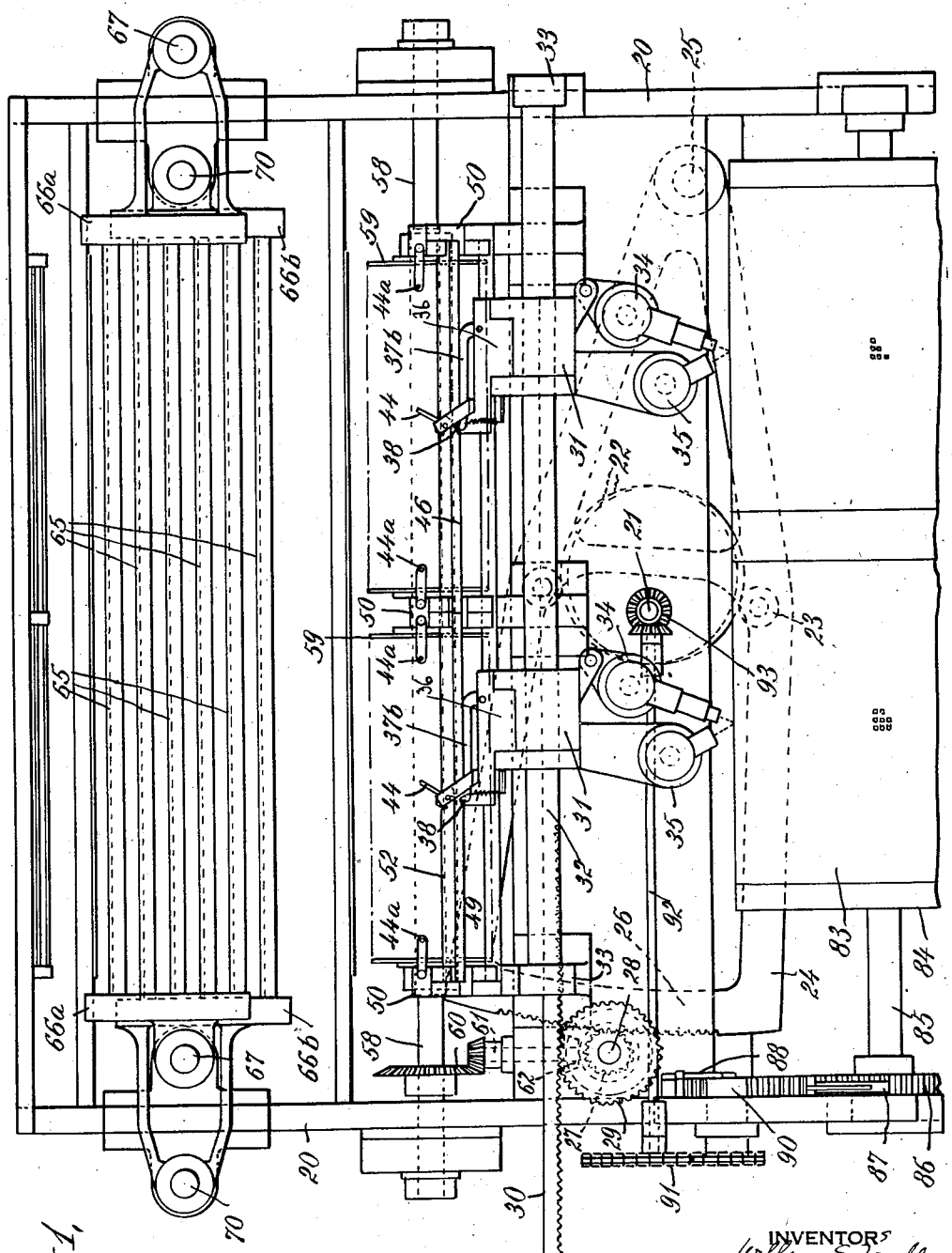

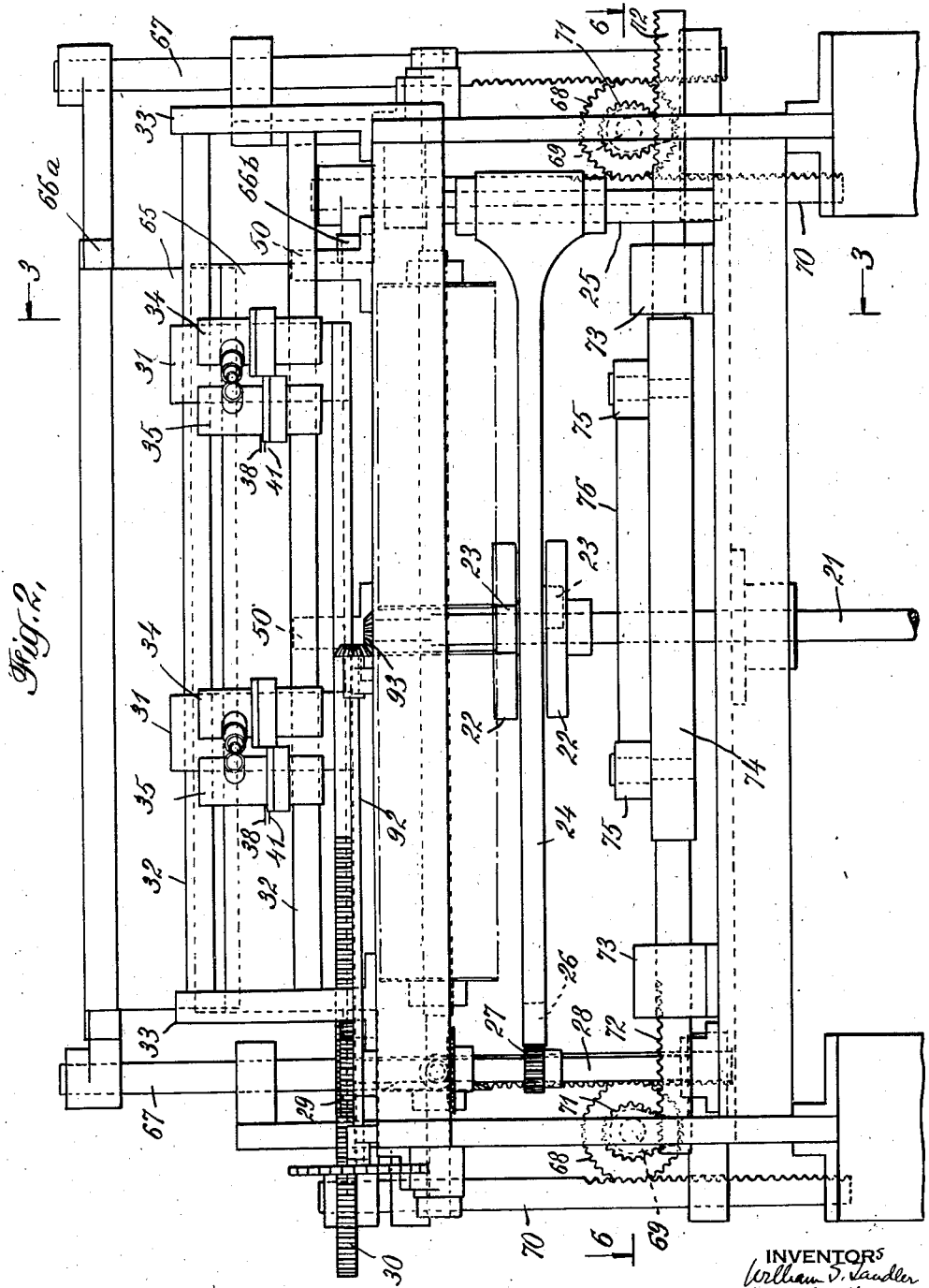

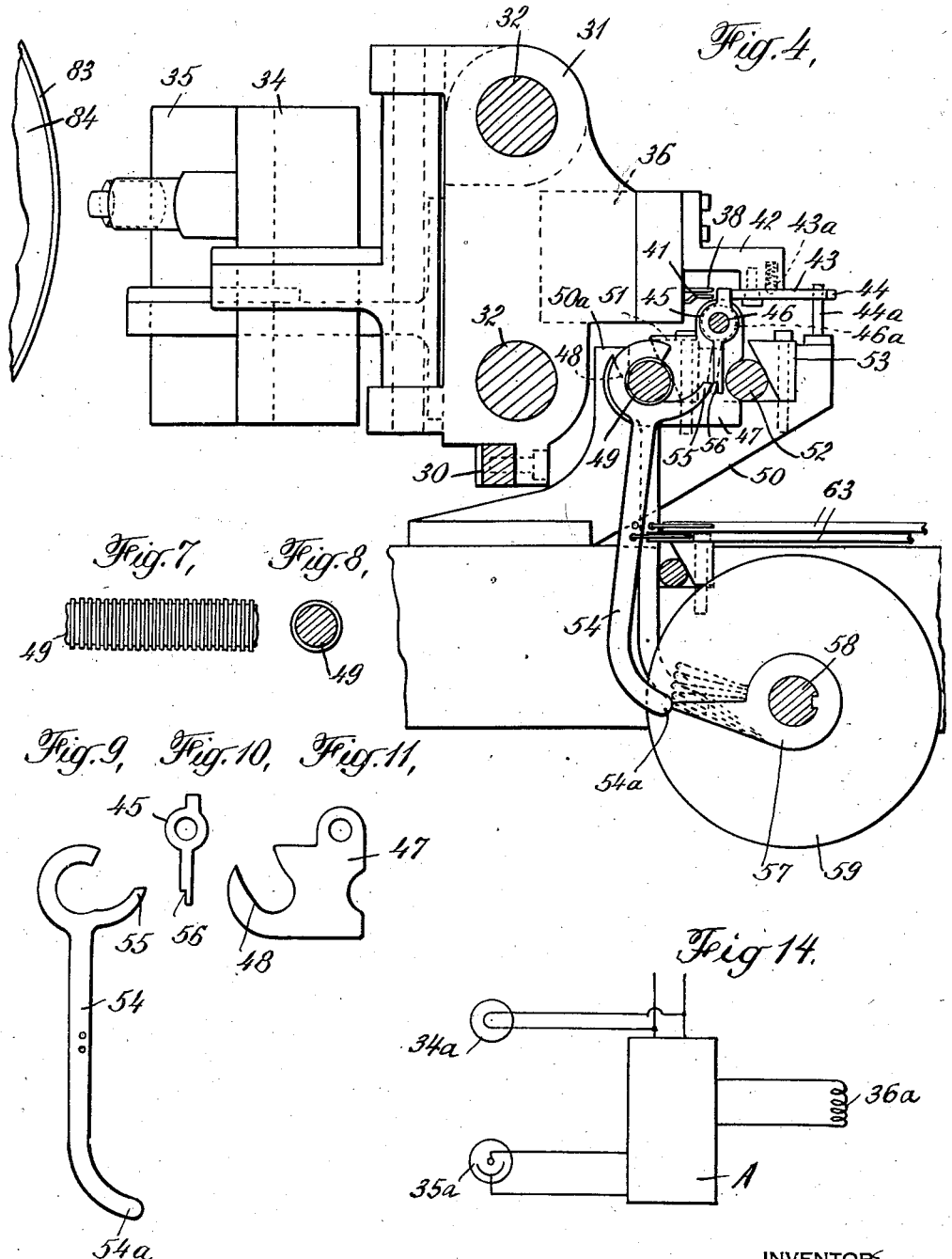

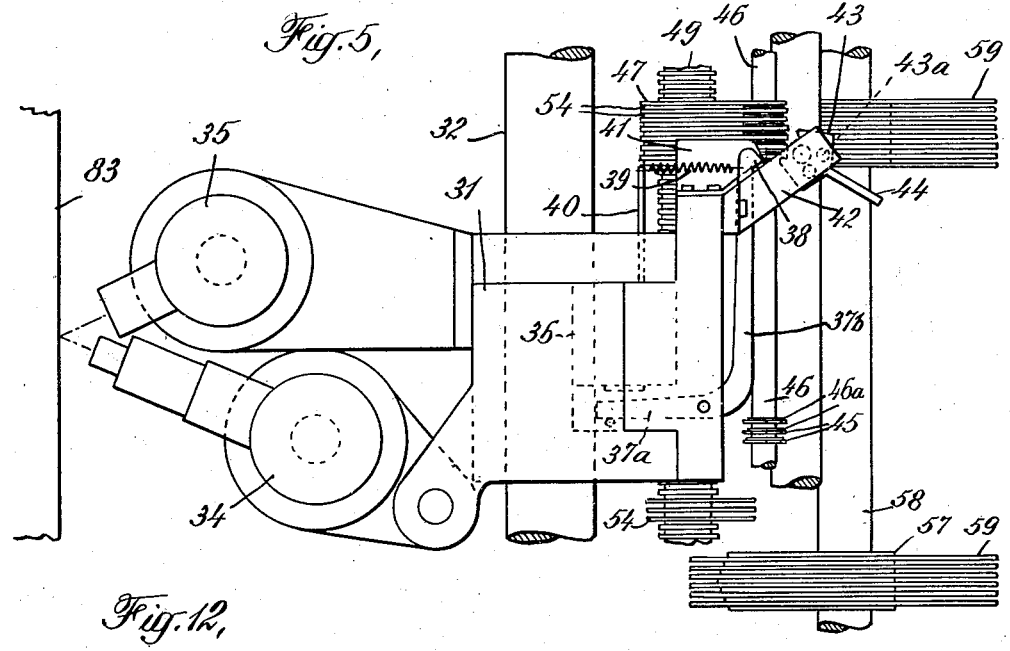

Patented Aug. 1, 1944

2,354,843

UNITED STATES PATENT OFFICE 2,354,843

CONTROL MECHANISM

William S. Tandler, David Walker, and William Teller, New York, N. Y., assignors to Lefier Corporation, New York, N. Y., a corporation of Delaware Application September 12, 1941, Serial No. 410,516

8 Claims. (Cl. 139—319)

This invention relates to apparatus for controlling the operation of a machine having a plurality of parts to be selectively actuated, an example of such a machine being a loom for weaving figured fabrics in which the warp threads are manipulated by heddles in accordance with a pattern to reproduce the desired design on a fabric. More particularly, the invention is concerned with a novel control apparatus of the electromechanical type which includes a plurality of members, referred to as selector members, which may be employed to control the action of the parts of the machine to be selectively actuated, and a pattern-controlled magnetically operated hammer by which the members are selectively brought into operation.

The apparatus of the invention is capable of use for controlling the operation of machines of various types, but is particularly useful in controlling the operation of a loom. An embodiment of the invention suitable for controlling a loom will, accordingly, be illustrated and described for purposes of explanation and in that form, the new apparatus includes a device resembling and functioning like a Jacquard mechanism but including various novel features which simplify the construction and make it more satisfactory and reliable in operation.

For a better understanding of the invention, reference may be had to the accompanying drawings in which Fig. 1 is a plan view of an apparatus constructed in accordance with the invention and employed in controlling the operation of a loom;

Fig. 2 is an elevational view of the apparatus;

Fig. 3 is a sectional view on the line 3—3 of Fig. 2, with parts omitted;

Fig. 4 is a fragmentary sectional view similar to Fig. 3 but on a larger scale;

Fig. 5 is a plan view of the apparatus shown in Fig. 4;

Fig. 6 is a sectional view on the line 6—6 of Fig. 2;

Figs. 7 and 8 are fragmentary elevational and sectional views, respectively, of a part of the mechanism shown in Fig. 4;

Figs. 9, 10, and 11 are elevational views of parts illustrated in Fig. 4;

Fig. 12 is a vertical sectional view of part of the mechanism illustrated in Fig. 3 but on a larger scale;

Fig. 13 is a vertical sectional view at right angles to Fig. 12, and

Fig. 14 is a wiring diagram.

Referring now to the drawings, the apparatus shown in Fig. 1 includes a suitable frame 20 made up of uprights and horizontal members, and mounted for rotation in bearings on the frame is a vertical shaft 21 which is the main drive shaft of the device. Fast on the shaft are upper and lower cams 22 and the edge of each cam is engaged by a roller 23 mounted on one of the arms of a generally triangular frame 24. The rollers lie at opposite sides of shaft 21 and the frame is mounted for oscillation about a vertical rod 25 supported in the framework. As the shaft 21 rotates, the frame is swung back and forth about rod 25 as an axis.

The ends of the arms of the frame are connected by a curved bar 26 having teeth meshing with a gear 27 on a vertical shaft 28. The shaft 28 carries another gear 29 meshing with a rack 30 to which are attached a pair of carriages 31 mounted for sliding movement on parallel rails 32 mounted on side plates 33 forming part of the framework.

On each carriage is mounted a projector 34, which throws a beam of light against a pattern sheet, and a housing 35 containing a photoelectric cell, which is sensitive to the light reflected from the spot on the pattern sheet struck by the beam. The projector and cell housing are supported for rotational adjustment on the carriage and the latter also carries an electromagnet 36 and a bell crank lever which is pivoted near the point where its arms meet. One arm 37a of the lever serves as the armature of the electromagnet and the other arm 37b terminates in a point 38 and the lever functions as a hammer for operating the selector members. A spring 39 attached at one end to a pin 40 secured to a fixed part of the carriage and at the other end to the arm 37b maintains the hammer normally inoperative.

A cam plate 41 serving as a means for placing the selector members in uniform position is mounted on each carriage beneath the hammer and on an extension 42 from the carriage above the hammer is pivoted a cam member 43 which serves as a means for restoring the selector members to inoperative position. The cam member 43 has two operative points and a tail 44, and as the carriage moves in one direction, one of the operating points of the cam is effective. When the carriage reaches the end of its travel, the tail strikes a rod 44a fast on a part of the machine and this swings the cam to bring the other point into action. A spring pressed ball 43a in extension 42 seats in one or the other of a pair of depressions in cam 43 to hold the latter in effective position.

The electromagnetic hammer on each carriage acts on a group of selector members 45 which are mounted on a rod 46 with adjacent members spaced by partition members 47 having openings through which the rod 46 passes and in which it is supported. A spring washer 46a lies between each selector member 45 and one of the adjacent partition members and the washer acts on the selector member to hold the latter in whatever position relative to rod 46 it may be placed. The partition members 47 have curved recesses 48 in which is received a circumferentially grooved rod 49 mounted in side and central supports 50 on the machine framework. Each rod 49 is held against upright portions 50a on the supports 50 by blocks 51 bolted to the supports. The partition members are held in position with the rod 49 entering their recesses 48 by a rod 52 resting on supports 50 and held in position by blocks 53 bolted to the supports.

The side edges of the recess 48 in each partition member 47 enter a groove in rod 49 and control elements 54 in the form of levers, one for each selector member, are mounted on the rod between adjacent partition members. Each lever has a tail 55 which, in one position of the lever, may enter a notch 56 in its associated selector member 45 to be held thereby against swinging movement in a counterclockwise direction. Below the rod 49, each lever terminates in a curved end 54a which is engaged and swung during the operation of the machine to bring the tail 55 into a position where it may enter the notch of its associated selector member, if that member has been struck by the hammer.

During the operation of the machine, the levers 54 are engaged by crank plates 57 mounted fast on a shaft 58 and separated by discs 59. The crank plates are successively offset angularly lengthwise of the shaft, so that as the shaft is oscillated, the plates come successively into action and swing levers 54, one after another. The group of crank plates thus function like a helical cam. Shaft 58 is driven by bevel gearing 60 from shaft 61 which is, in turn, driven through bevel gearing 62 from shaft 28. Shaft 58, accordingly, has an oscillating motion.

A connector 63 is attached at one end to each lever 54 between the ends of the latter and at the other to a spring 63a secured to a fixed part of the machine. As each lever 54 is swung, it pulls its connector to the left (Fig. 4) against the action of its spring 63a attached to the connector and, since the levers are swung successively by the helical cam, instead of in a body, vibration and strain on the machine are greatly reduced.

Each connector has a pair of openings through which pass hooks 64 which are engageable by knives 65 arranged in two groups of three. The knives in one group are operable to engage one of the two hooks of each connector while the knives in the other group are engageable with the other hook of each connector. The knives of one group are mounted between end plates 66a near the tops of the knives and those of the other group are mounted between end plates 66b near the lower ends of the knives. Each end plate 66a is connected to a rack 67 mounted for vertical movement in guides in the frame work and each rack 67 meshes with a gear 68 on a shaft 69 journaled in the framework. The end plates 66b are connected to racks 70 which are similar to racks 67 and each rack 70 meshes with the gear 68 and lies at the opposite side of a shaft 69 from one of the racks 67. A pinion 71 on each shaft 69 meshes with a rack 72 mounted for movement in a guide 73 on the framework and the racks 72 are connected to a plate 74 having rollers 75 bearing at all times on diametrically opposite portions of the outer surface of a cam 76 on shaft 21. With this arrangement, the rotation of shaft 21 causes racks 72 to rotate shafts 69 first in one direction and then the other. The rotation of the shafts 69 causes racks 67 and 70 to move up and down with a positive movement and, as a result, the groups of knives are reciprocated up and down positively with one group rising as the other moves down. The cam 76 is not precisely circular but is flattened through a part of its circumference so that the knives are moved up or down with a rapid positive movement, then remain at rest, and are then moved rapidly in the opposite direction. As a result of the use of such a cam, the shed stays open longer than it would if the knives were raised and lowered by crank action.

Each hook 64 is connected at its lower end to a slotted sheet metal strip 77, referred to as a loop, which is vertically movable and is guided in its movement by a channel member 78. The loops 77 of a pair of hooks which pass through openings in the same connector are connected at their lower ends to the upper corners of a tumbler 79 by hooks 80 on the tumbler which pass through the slots in the respective loops. Each hook 80 has a neck, narrower than a slot, and an enlarged head. By swinging the tumbler relatively to the loop and spreading the parts of the loop slightly to enlarge the slot, the head of the hook may be readily passed into and out of the slot. The lower end of the tumbler is connected to the cord 81 of a heddle eye. The downward movement of the loops 77 is limited by wires 82 secured to the channel member 78 and passing through the slots in aligned loops across the machine.

The operation of the apparatus is controlled by a pattern sheet 83 on a drum 84 mounted on a shaft 85 journaled in a suitable part of the machine framework. Also mounted on the shaft 85 is a ratchet wheel 86 which is engaged by a spring-pressed stop pawl 87. During the operation of the machine, the drum is advanced step by step by a spring-pressed pawl 88 having one end sliding on a sloping guide block 89 secured to the framework and its other end connected eccentrically to a disc 90 on a shaft having a sprocket wheel driven by a chain 91 from a sprocket wheel on shaft 92 driven by bevel gearing 93 from shaft 21. The lower end of the pawl 88 engages the teeth of the ratchet wheel 86 and advances the wheel by one tooth, one for each revolution of the disc 90.

In the loom illustrated, the hooks controlling the heddle eyes are divided into two groups and a group of selector members is provided for each group of hooks. The action of each group of selector members is controlled by the electromagnetic hammer on one of the carriages 31 and, with this arrangement, each carriage has half the traverse that would be required if a single carriage were employed. Since two carriages are employed and each has its own pattern scanning means, the pattern sheet has two effective portions and each portion is scanned by the mechanism on one carriage. The pattern sheet has areas of different light reflecting power and as the beam from the lamp 34a in a projector strikes one of these areas, the reflected light passes to the photoelectric cell 35a. The cell is connected to an amplifier A and controls the flow of current from a supply to the solenoid of the electromagnet on its carriage so that the hammer is brought into action or remains at rest at any particular instant according to the light reflecting power of the pattern area being scanned at that instant.

During the operation of the machine, the carriages move in unison back and forth along their respective groups of selector members. As the carriages move in one direction, the pattern drum is at rest and when the carriages have moved to the limit of travel in that direction, the pattern drum is advanced one step and the carriages then return. As each carriage moves along its group of selector members, the restoring cam 43 on the carriage strikes any selector members that may have previously been moved from normal position and restores them at that position, the cam 41 cooperating with cam 43 and preventing the members from being moved past the desired position by cam 43. Immediately thereafter, the electromagnet is caused to act on the hammer by energization of the solenoid whenever the pattern requires. During the time that the carriages are traveling, the shaft 58 is oscillating to cause the spiral cam made up of the crank members 57 thereon to swing the levers successively. The travel of the carriages and the oscillation of shaft 58 are so coordinated that whenever a lever 54 is swung, its associated selector member may be struck immediately thereafter by a hammer and moved, so that the tail 55 of lever 54 is received in notch 56 of the selector member. The selector member is thereupon effective to prevent return movement of the lever by the spring 63a secured to the connector 63 attached to the lever. When a particular lever is thus held against return movement, its connector is in a position such that its hooks 64 are out of the path of the knives 65 and, therefore, when one set of knives is raised, the hooks will remain in their down position. If the selector member of a particular lever is not struck by the hammer, the lever will be drawn back to normal position by the action of the spring 63a acting on its connector 63. The hooks controlled by the connector will then lie in the path of the knives and one of the hooks will be engaged by a knife of one set and raised when that group of knives rises.

The selector members controlled by each carriage are traversed by that carriage once for each insertion of a pick by the loom and with each such traverse of the carriage, the hooks controlled by the selector members are positioned so that the proper shed will be formed on the next action of the knives. The positions of the warp threads, whether in the upper or lower parts of the shed, are determined by the action of each hammer on the selector members of its group and, since the hammer is actuated under the control of the scanning mechanism consisting of the projector and photoelectric cell, the selector members are selectively actuated under the control of the pattern. The pattern mechanism thus acts to segregate the selector members into two sets or groups, the members of one set acting on their levers 54 in such manner that the hooks controlled by the levers are kept out of the path of the knives and not moved thereby while the members of the other set permit the levers and hooks to assume positions in which the hooks are engaged and raised by the knives.

The connectors, hooks, loops, and tumbler constitute an improved form of Jacquard mechanism and these parts are made of sheet metal stampings instead of the usual wires. This permits smaller tolerances to be employed and thus increases the accuracy of the selecting operation performed by the selecting mechanism. Also, the improved Jacquard mechanism is of more rigid construction than those involving the use of wires and, as a result, there is a reduction in the amount of power required to drive the mechanism and higher speeds are permitted. The lifting mechanism by which the two sets of knives are alternately raised and lowered, which includes gears and pairs of racks meshing therewith, is not only much lighter than the mechanism previously used but, in addition, the moving parts are of less inertia and the operation of the mechanism is more accurate.

We claim:

1. In an apparatus for controlling the operation of a plurality of machine parts, the combination of a group of selector members, a group of control elements, one for each member, elongated connectors attached to the control elements and adapted to be connected to said parts, said elements and connectors normally occupying definite initial positions, means for moving the elements to new positions and simultaneously advancing the connectors endwise with the elements, means movable along the group of selector members and operable to select and move members of the group to positions in which the selected members engage their respective control elements and hold them and their connectors in their new positions, means acting on the control elements and their connectors to resist movement thereof from their initial positions, said means acting after said selected selector members have engaged their respective control elements to restore the remaining control elements and their connectors to their initial positions, and pattern-controlled means for controlling the operation of the selecting and moving means.

2. In an apparatus for controlling the operation of a plurality of machine parts, the combination of a group of selector members, a group of control elements, one for each member, elongated connectors attached to the control elements and adapted to be connected to said parts, said elements and connectors normally occupying definite initial positions, means for successively moving the elements to new positions and simultaneously advancing the connectors endwise with the elements, means movable along the group of selector members and operable to select and move members of the group to positions in which the selected members engage their respective control elements and hold them and their connectors in their new positions, means acting on the control elements and their connectors to resist movement thereof from their initial positions, said means acting after said selected selector members have engaged their respective control elements to restore the remaining control elements and their connectors to their initial positions, and pattern-controlled means for controlling the operation of the selecting and moving means.

3. In an apparatus for controlling the operation of a plurality of machine parts, the combination of a group of selector members, a group of control elements, one for each member, elongated connectors attached to the control elements and adapted to be connected to said parts, said elements and connectors normally occupying definite initial positions, means for successively moving the elements to new positions and simultaneously advancing the connectors endwise with the elements, means movable along the group of selector members and operable to select and move members of the group to positions in which the selected members engage their respective control elements and hold them and their connectors in their new positions, said means restoring previously selected and moved members to their initial positions in advance of performing its selecting and moving functions, means acting on the control elements and their connectors to resist movement thereof from their initial positions, said means acting after said selected selector members have engaged their respective control elements to restore the remaining control elements and their connectors to their initial positions, and pattern-controlled means for controlling the operation of the selecting and moving means.

4. In an apparatus for controlling the operation of a plurality of machine parts, the combination of a group of selector members mounted side by side for swinging movement on the same axis, each member having an arm extending therefrom, a group of control elements, one for each member, mounted side by side for swinging movement on the same axis, each element having a tail engageable with the arm on its associated selector member, elongated connectors attached to the control elements and adapted to be connected to said parts, said elements and connectors normally occupying definite initial positions, means for moving the control elements to new positions and simultaneously advancing the connectors endwise with the elements, means movable along the group of selector members and operable to select and move members of the group to positions in which the arms on selected members engage the tails of their respective control elements and hold said elements and their connectors in their new positions, means acting on the control elements and their connectors to resist movement thereof from their initial positions, said means acting after said selected selector members have engaged their respective control elements to restore the remaining control elements and their connectors to their initial positions, and pattern-controlled means for controlling the operation of the selecting and moving means.

5. In an apparatus for controlling the operation of a plurality of machine parts, the combination of a group of selector members mounted side by side for swinging movement on the same axis, each member having an arm extending therefrom, a group of control elements, one for each member, mounted side by side for swinging movement on the same axis, each element having a tail engageable with the arm on its associated selector member, elongated connectors attached to the control elements and adapted to be connected to said parts, said elements and connectors normally occupying definite initial positions, means for successively moving the control elements to new positions and simultaneously advancing the connectors endwise with the elements, means movable along the group of selector members and operable to select and move members of the group to positions in which the arms on selected members engage the tails of their respective control elements and hold said elements and their connectors in their new positions, means acting on the control elements and their connectors to resist movement thereof from their initial positions, said means acting after said selected selector members have engaged their respective control elements to restore the remaining control elements and their connectors to their initial positions, and pattern-controlled means for controlling the operation of the selecting and moving means.

6. In an apparatus for controlling the operation of a plurality of machine parts, the combination of a group of selector members mounted side by side for swinging movement on the same axis, each member having an arm extending therefrom, a group of control elements, one for each member, mounted side by side for swinging movement on the same axis, each element having a tail engageable with the arm on its associated selector member, elongated connectors attached to the control elements and adapted to be connected to said parts, said elements and connectors normally occupying definite initial positions, means for successively moving the control elements to new positions and simultaneously advancing the connectors endwise with the elements, an electromagnetically operated hammer movable along the group of selector members and operable to select and move members of the group to positions in which the arms on selected members engage the tails of their respective control elements and hold said elements and their connectors in their new positions, means acting on the control elements and their connectors to resist movement thereof from their initial positions, said means acting after said selected selector members have engaged their respective control elements to restore the remaining control elements and their connectors to their initial positions, and pattern-controlled means for controlling the operation of said hammer.

7. In an apparatus for controlling the operation of a plurality of machine parts, the combination of a group of selector members, a group of control elements, one for each member, connectors attached to the control elements and adapted to be connected to said parts, said elements and connectors normally occupying definite initial positions, means for successively moving the control elements to new positions and simultaneously advancing the connectors to move said parts connected thereto, means movable along the group of selector members and operable to move said members to inoperative position and thereafter to select and move certain members of the group to positions in which they engage their respective control elements and hold said elements and their connectors in their said new positions, means acting on the control elements and their connectors to resist movement thereof from their initial positions, said means acting after said selected selector members have engaged and are holding their respective control elements to restore the remaining control elements and their connectors to their initial positions, and pattern-controlled means for controlling the action of the means by which certain selector members are selected and moved.

8. In an apparatus for controlling the operation of a plurality of machine parts, the combination of a group of selector members, a group of control elements, one for each member, connectors attached to the control elements and adapted to be connected to said parts, spring means acting on the individual elements and their connectors for holding said elements and connectors normally in definite initial positions, means for successively moving the control elements and their associated connectors against the action of their spring means to new positions, means movable along the group of selector members and operable to move displaced members to inoperative position and thereafter to select and move certain members of the group to positions in which they engage their respective control elements and hold said elements and their connectors in their said new positions against the action of said spring means, said selecting and moving means including an electromagnetically operated hammer, for selecting and moving said selected members, and pattern-controlled means for controlling the operation of said hammer.

WILLIAM S. TANDLER.
DAVID WALKER.
WILLIAM TELLER.